United States Patent
Wick et al.

(10) Patent No.: US 6,473,241 B1
(45) Date of Patent: Oct. 29, 2002

(54) WIDE FIELD-OF-VIEW IMAGING SYSTEM USING A REFLECTIVE SPATIAL LIGHT MODULATOR

(75) Inventors: David V. Wick, Albuquerque; Ty Martinez, Edgewood, both of NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/683,147

(22) Filed: Nov. 27, 2001

(51) Int. Cl.[7] ................................................ G02B 27/14
(52) U.S. Cl. ...................................... 359/637; 359/633
(58) Field of Search ................................. 359/637, 629, 359/630, 633, 724, 291, 290

(56) References Cited

U.S. PATENT DOCUMENTS

| | | | | |
|---|---|---|---|---|
| 5,808,589 A | * | 9/1998 | Fergason | 345/8 |
| 6,137,636 A | * | 10/2000 | Smith | 359/630 |
| 6,252,898 B1 | * | 6/2001 | Geisler et al. | 383/232 |
| 6,331,916 B1 | * | 12/2001 | Mukawa | 359/630 |

OTHER PUBLICATIONS

Geisler, W. S. and Perry, J. S. (1998), "A real–time foveated multi–resolution system for low–bandwidth video communication," In B. Rogowitz and T. Pappas (Eds.), Human Vison and Electronic Imaging, SPIE Proceedings, 3299, 294–305.

R. K. Tyson, "Principles of Adaptive Optics," Academic Press, San Diego, 1998, chap. 6.

G. Vdovin, S. Meddelhoek, M. Bartek, P.M. Sarro, D. Solomatine, "Technology, characterization and applications of adaptive mirrors fabricated with IC–compatible micromachining," Proc. SPIE vol. 2534, p. 116, 1995.

P. Halevi, "Bimorph piezoelectric flexible mirror: graphical solution and comparison with experiment," J. Opt. Soc. Am. vol. 73, p. 110, 1983.

* cited by examiner

Primary Examiner—Georgia Epps
Assistant Examiner—Richard Hanig
(74) Attorney, Agent, or Firm—James M. Skorich

(57) ABSTRACT

PRS0847A foveated imaging system using a relatively simple optical imaging system with a reflective spatial light modulator at or near a pupil plane to correct off-axis aberrations. Maximum resolution is obtained for a single fixation point (foveal region) within the field of view at a time. The fixation point can be changed manually, by a predetermined scan pattern, or automatically varied for surveillance or tracking applications. A pre-calibrated look up table is used to vary the reflective spatial light modulator for each fixation point.

5 Claims, 1 Drawing Sheet

WIDE FIELD-OF-VIEW IMAGING SYSTEM USING A REFLECTIVE SPATIAL LIGHT MODULATOR

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The invention relates generally to wide field of view optical systems and more specifically, provides a foveated imaging optical system using a simplified optical system with a reflective spatial light modulator. This invention is related to co-pending application 09/681,485 filed on Apr. 16, 2001 by 2 of the 3 original inventors.

The human eye has a wide field of view (FOV) but the spatial resolution decreases as a function of the angular distance from the direction of gaze or point of fixation. The retina has a high concentration of cone photoreceptors within a few degrees of the point of gaze. This central area of high cone density is called the fovea. Cone density and consequently spatial resolution fall off rapidly with increasing field angle measured from the point of fixation. Resolution drops 50% at 2.5 degrees off the point of gaze and by a factor of ten at 20 degrees.

This phenomenon has been exploited in a number of ways to reduce the bandwidth required to transmit digital images. For example, a spatially variant filter or a software algorithm might be applied to an otherwise high-resolution image that would maintain high fidelity around a fixed point in the field-of-view, the region of interest, while reducing spatial resolution over the rest of the image. This foveated imaging mimics the human eye and reduces the bandwidth needed to transmit the useful image. Eye tracking apparatus or a computer mouse might be used at the receiving end to move the region of interest over the image. The spatially variant filter would then track this "eye" movement, keeping the high-resolution portion of the image at the point of gaze. (Geisler, W. S. and Perry, J. S. (1998), "A real-time foveated multi-resolution system for low-bandwidth video communication," In B. Rogowitz and T. Pappas (Eds.), *Human Vision and Electronic Imaging*, SPIE Proceedings, 3299, 294–305.)

While these foveated-imaging systems reduce the required bandwidth of digitally transmitted images, they still require high-quality and potentially complex optical imaging systems to produce the initial high-resolution images, i.e., near diffraction limited quality over the entire image for wide FOV, low f-number systems. There is a need for a relatively simple and inexpensive optical imaging system with a wide FOV and low f-number that would create a foveated image at the transmitting end of a video transmission, i.e., an optical imaging system that would yield high resolution only for that portion of the image corresponding to the region of interest at the receiving end. Degraded resolution would be acceptable away from the point of fixation or interest.

SUMMARY OF INVENTION

A relatively simple and potentially inexpensive optical system with a reflective spatial light modulator (SLM) located at or near a pupil plane is used to produce a foveated image. This system increases the useable FOV of a wide-angle, low f-number optical imaging system. The reflective SLM is programmed to correct aberrations and, therefore, provide maximum resolution at a particular point of interest within the FOV of the system. Degraded resolution occurs away from the point of interest, mimicking the variable spatial resolution of the human eye. This enables a simple and inexpensive optical imaging system to be employed for a fixed, wide-angle, low f-number surveillance system, for example, while taking advantage of the reduced bandwidth necessary to transmit the image to a remote site. The point of interest can be remotely varied using a preset scan pattern, an eye tracking apparatus, track ball, or other device. The system can also be used for tracking the movement of an object of interest within the FOV.

Other aspects and advantages of the present invention will become apparent from the following detailed description, taken in conjunction with the accompanying drawing, illustrating by way of example the principles of the invention.

DETAILED DESCRIPTION

Figure 1:
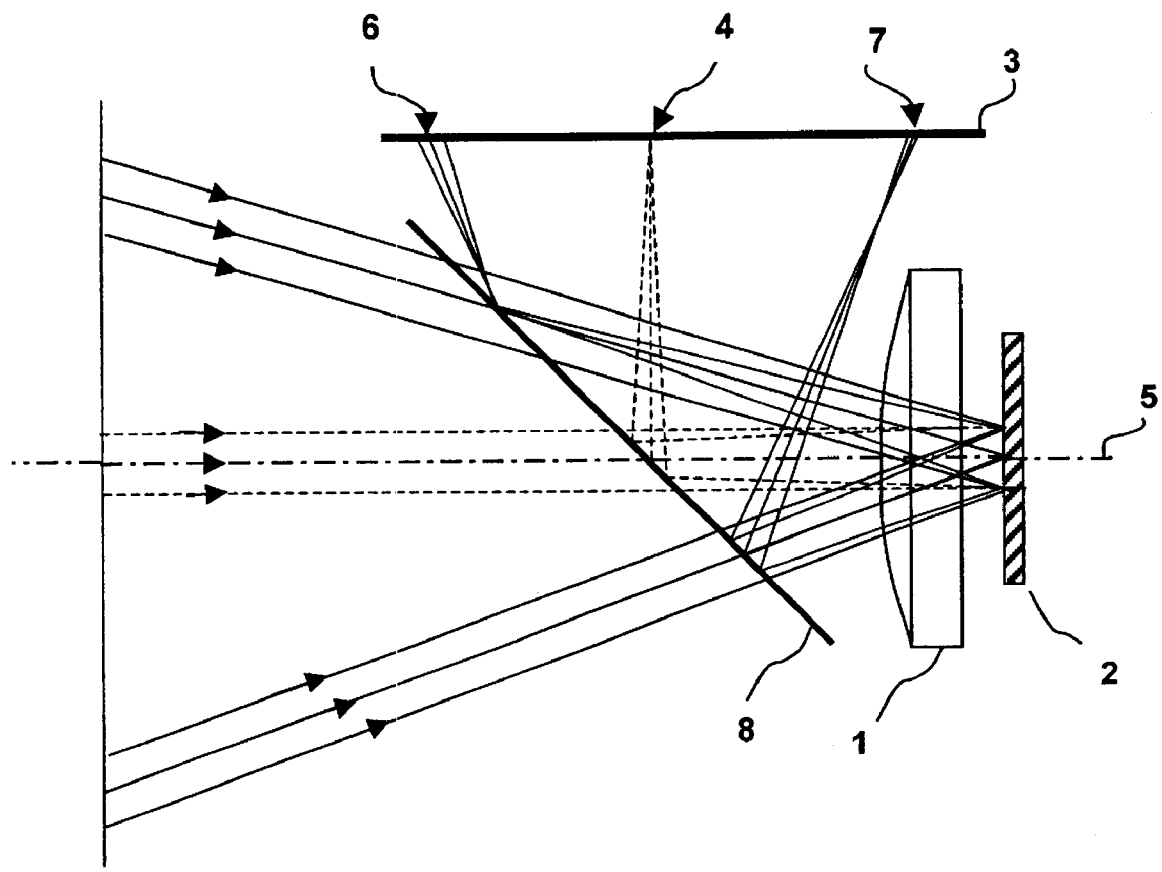
FIG. 1 is a cross-section of a simple optical imaging system with a reflective SLM near a pupil plane correcting the aberrations for a portion of the image at a selected off-axis angle corresponding to the point of interest.

A relatively simple and potentially inexpensive wide FOV, low f-number optical system with a spatial light modulator (SLM) located at or near a pupil plane can be used to directly produce a foveated image. This image can then be transmitted at a reduced bandwidth to a remote-viewing site. A simple optical imaging system typically has a limited useful FOV due to numerous off-axis aberrations that degrade image quality. This is particularly true for a low f-number optical imaging system. To provide the best possible resolution for the entire FOV typically requires a complex and expensive optical imaging system. This high quality image would then be degraded except for the point of interest for bandwidth limited transmission from a remote site.

A reflective spatial light modulator (SLM) placed at or near a pupil plane of a simple optical imaging system can produce near diffraction-limited resolution at much larger field angles than would otherwise be possible. Field angles are used here to locate a point of gaze or fixation point within the FOV. They can be defined by polar coordinates ( $\theta$, $\phi$) referenced to the optical axis. A consequence of improving the resolution at a particular region of the image is to degrade the resolution of the remaining part. Thus, within a large field-of-view image, a limited region of interest (foveal region) would have high-resolution and appear in-focus and peripheral areas would appear somewhat out of focus. This system is similar to the operation of the human eye and is called foveated imaging. Foveated imaging is a consequence of the present invention because it is only possible to correct for a single point of interest at any given time using a reflective SLM. The in focus region can be arbitrarily moved around the FOV by controlling the SLM.

FIG. 1 illustrates how the foveated imaging system might be implemented using a reflective SLM. A simple optical imaging system 7 collects light over a wide FOV. The reflective SLM 2 is placed at or near the pupil plane and is used to correct aberrations at any point within the FOV. A two-way mirror 8 reflects the image onto the detection plane 3. The image appears in focus at the detection plane 3 at point 4, corresponding to a direction defined by field angles θ, φ referenced to the optic axis 5. In this drawing, the in-focus area is along the optic axis. Two other out-of-focus directions 6, 7 are also shown. The corrective settings for the reflective SLM for each combination of field angles for this particular optical system are contained in a look up table.

The reflective SLM can be either a microelectromechanical system (MEMS) mirror, a bimorph mirror, or any other suitably deformable mirror well known in the art. It may also consist of many transmissive liquid crystal pixels, each of which is independently addressed to provide the desired wavefront correction, with a high quality mirror back-plane. A good reference for both types is Robert K. Tyson, "Principles of Adaptive Optics—Second Edition" (Academic Press, San Diego, 1998), Ch. 6.

MEMS mirrors are controlled via electrostatic attraction or repulsion. Control electrodes (actuators) are positioned behind the mirror, and the voltages sent to those individual actuators determine how the mirror is deflected. The mirror is pushed or pulled depending on the polarity of the voltage (i.e., negative or positive), and the magnitude of deflection is determined by the magnitude of the voltage. (See for example, G. Vdovin, S. Middelhoek, M. Bartek, P. M. Sarro, D. Solomatine, "Technology, characterization and applications of adaptive mirrors fabricated with IC-compatible micromachining," Proc. SPIE vol. 2534, p. 116, 1995.

Bimorph mirrors have a similar operation except that the reflecting surface is glued to a piezoelectric ceramic material. Rather than being deflected by the voltage, the piezoelectric ceramic expands or contracts with applied voltage to deform the mirror. See for example, P. Halevi, "Bimorph piezoelectric flexible mirror: graphical solution and comparison with experiment," J. Opt. Soc. Am. vol. 73, p. 110, 1983.

The voltages applied to individual pixels or actuators would be calibrated prior to deployment to correct for the particular aberrations of a particular optical imaging system for the range of potential fixation points on the image. In polar coordinates, there would be an optimum reflective SLM setting for each quantized (θ, φ) (field angle) combination. If the optical imaging system were perfectly symmetric, aberrations would be corrected over an annulus about the optical axis encompassing the point of interest. The portion of the image being viewed at any given time (point of interest) can be varied using an eye tracking apparatus, track ball, or other such device.

The system readily lends itself to real-time surveillance, either at the imaging system site or at a remote location. Remote surveillance would require less transmission bandwidth than the prior art since only the region of interest is highly resolved. A two-way transmission linkage could accomplish remote control of the SLM for varying the point of interest. In either case, the complexity and expense of the optical imaging system would be much reduced.

Optical tracking is another application that would benefit from this foveated imaging system with the foveal region locked on an object of interest either manually or automatically. Normally, a low resolution, wide FOV optical system is used to acquire a moving object of interest using frame to frame comparisons to detect any movement. Once detected, the object is handed off to a second high-resolution optical system with a limited field of view for automated, high-resolution tracking and identification. The present invention could perform both the acquisition and tracking functions. A moving object of interest would be automatically detected using conventional acquisition methods (e.g. a frame by frame comparison algorithm). The SLM would then be re-addressed to maximize resolution of the target. Automated detection of the movement using conventional tracking techniques would then yield the position of the object as a function of time. The position of the target would be fed to the SLM in real-time, thus maintaining high resolution on the target.

What is claimed is:

1. A foveated imaging system comprised of:
   an optical imaging system having a field of view, off-axis aberrations, and a pupil plane;
   a reflective spatial light modulator positioned at or near the pupil plane of the optical imaging system to correct the aberrations at a fixation point within the field of view;
   means for varying the fixation point over time; and
   means for controlling the reflective spatial light modulator whereby maximum resolution is obtained at any particular fixation point as the fixation point is varied over time.

2. The foveated imaging system of claim 1, wherein the means for varying the fixation point over time is an eye movement tracking system.

3. The foveated imaging system of claim 1, wherein the means for varying the fixation point over time is a computer track ball.

4. The foveated imaging system of claim 1, wherein the means for controlling the reflective spatial light modulator is a look up table containing predetermined settings for each fixation point.

5. The foveated imaging system of claim 1, wherein the foveated imaging system is further comprised of a means for automatically acquiring and tracking a moving object within the field of view.

\* \* \* \* \*